United States Patent
Matsushita

(10) Patent No.: US 6,427,105 B1
(45) Date of Patent: Jul. 30, 2002

(54) ELECTRIC POWER STEERING CONTROL SYSTEM AND CONTROL METHOD THEREOF

(75) Inventor: Masaki Matsushita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/043,226

(22) Filed: Jan. 14, 2002

(30) Foreign Application Priority Data

Sep. 4, 2001 (JP) ..................................... P2001-266793

(51) Int. Cl.[7] ................................................ G05E 7/00
(52) U.S. Cl. ........................... 701/41; 701/42; 180/446
(58) Field of Search .............................. 701/41, 42, 44; 180/410, 443, 444, 446; 440/53

(56) References Cited

U.S. PATENT DOCUMENTS

| | | | | |
|---|---|---|---|---|
| 5,521,475 A | * | 5/1996 | Fu et al. ...................... | 180/446 |
| 6,116,372 A | * | 9/2000 | Mukai et al. ................ | 180/446 |
| 6,122,579 A | * | 9/2000 | Collier et al. ................. | 701/41 |
| 6,161,068 A | * | 12/2000 | Kurlhige et al. .............. | 701/41 |
| 6,250,418 B1 | * | 6/2001 | Shimizu et al. ............. | 180/446 |
| 6,272,410 B2 | * | 8/2001 | Oyanoue et al. ............. | 701/42 |

FOREIGN PATENT DOCUMENTS

| JP | 61-199470 | 9/1986 |
|---|---|---|
| JP | 11-77872 | 7/1989 |

OTHER PUBLICATIONS

"Logic of AC Servo System and Design Practice", pp. 86–98, May 10, 1994.
"Effects and Compensation of Magnetic Saturation in Flux–Weakening Controlled Permanent Magnet Synchronous Motor Drives", IEEE Transaction on Industry Aplications, pp. 1632–1637, vol. 30, No. 6, Nov./Dec. 1994.

* cited by examiner

Primary Examiner—Richard M. Camby
(74) Attorney, Agent, or Firm—Sughrue Mion, PLLC

(57) ABSTRACT

An electric power steering control system in which by using a brushless motor as a motor for generating steering assist force, less trouble occurs, and an error in torque control and transient vibration are small even when a steering wheel is turned sharply.

The electric power steering control system is arranged so as to control a drive current of a brushless motor that generates a steering assist force on the basis of steering torque acting on a steering shaft and a vehicle speed. The system comprises a d-q axis voltage command section for computing a d- and q-axis voltage command value in response to a deviation of current between a d- and q-axis current command value and a d- and q-axis detection current value, a d-q coordinate inverse transformation section for performing the d-q coordinate inverse transformation on the basis of the d- and q-axis voltage command value and an electrical angle signal eventually thereby computing a three-phase voltage command value, and a PWM output section for generating a PWM waveform for PWM drive of the brushless motor in response to the three-phase voltage command compensation value.

14 Claims, 6 Drawing Sheets

ELECTRIC POWER STEERING CONTROL SYSTEM AND CONTROL METHOD THEREOF

BACKGROUND OF THE INVENTION

1. Technical Field

The present invention relates to an electric power steering control system for an automobile and to a control method thereof, in which an assist force when manipulating a steering wheel is generated by means of a motor.

2. Background Art

As a power steering system for an automobile, an electric power steering apparatus has been developed which apparatus detects a vehicle speed and a steering torque acting on a steering shaft, drives a motor by a drive current determined in response to the detected vehicle speed and torque, adds an assist force onto the steering shaft by means of a rotational force of the motor, and then provides a driver a comfortable steering feeling.

Hitherto, in such a type of electric power steering apparatus, as a motor for adding the assist force onto the steering shaft, a DC electric motor with a brush such as a commutator motor has been mainly used. Since the motor is with a brush, however, it is possible that any trouble or abnormal state occurs in the motor itself.

Therefore, recently use of a brushless motor has been proposed instead of the DC electric motor with a brush. However, such a motor and/or a control apparatus come to be complicated and expensive. Thus, to put into practice the control suitable for the power steering apparatus, several inherent problems to be overcome remain in terms of cost or performance.

In the electric power steering control system, the motor for assisting the steering is connected to the steering wheel through a reduction gear. As he driver directly touches the steering wheel, the motor is required to have less fluctuation in torque and less vibration. Moreover, As rotation of the motor follows a steering speed of the steering wheel, the motor is forced to abruptly start or stop depending upon steering conditions.

Considering an arrangement of the control system of the electric power steering control unit using a brushless motor, as motor current of the brushless motor is an alternating current, the current control may get worse due to the steering conditions depending upon the arrangement of the current control system. As a result, an error in torque control and transient vibration are increased and the steering assist performance of the electric power steering control system is lowered in some cases.

For example, FIG. 4 shows an arrangement of an electric power steering control system which a PM (permanent magnet) brushless motor is used as a steering assist motor and the electric current is controlled with a three-phase alternating current.

Referring to FIG. 4, a PM brushless motor 5a is PWM driven by a PWM drive section 101. A control computer 200 computes three-phase voltage command values Vu*, Vv*, Vw* on the basis of a vehicle speed detected by a speed sensor 6, a steering torque detected by a torque sensor 3, a rotational position of the brushless motor 5 detected by a position sensor 103, and three-phase alternating currents Iu, Iv detected by current sensors 102a, 102b. Then the PWM drive 101 is controlled by the mentioned three-phase voltage command values Vu*, Vv*, Vw*.

The control computer 200 includes a d-q axis current command section 200a for computing d-axis and q-axis current command values Id*, Iq* for generating a steering assist force in response to a predetermined characteristic on the basis of the steering torque and the vehicle speed, an electrical angle computing section 200b for computing an electrical angle signal θ in response to the rotational position of the brushless motor 5 detected by the position sensor 103, a d-q coordinate inverse transformation section 200c for performing d-q coordinate inverse transformation of the d-axis and q-axis current command values Id*, Iq* on the basis of the electrical angle signal θ thereby computing three-phase current command values Iu*, Iv*, and a three-phase voltage command section 200d for computing the three-phase voltage command values Vu*, Vv*, Vw* in accordance with deviation values of the three-phase current command values Iu*, Iv* and the three.-phase alternating currents Iu, Iv inputted to the brushless motor 5.

The PM brushless motor 5 generates a torque by delivering sine-wave currents to the three phases in accordance with the electrical angle as shown in FIG. 6, for example. As the motor output torque is in proportion to amplitude of the sine-wave currents, controlling the current amplitude controls the output torque of the PM brushless motor 5.

The mentioned electrical angle is an angle in which pairs of S and N poles of a rotor in the PM brushless motor are arranged to be 360 degrees. By way of example, FIG. 5 shows the relation between electrical angle and mechanical angle in case of an eight-pole motor.

In the electric power steering control system as described above, under the condition of holding the steering wheel, generating a torque without rotating the brushless motor 5 performs steering assist. For example, supposing that the electrical angle is positioned at 50 [deg] (on a broken line in FIG. 6), the electric current flowing in the form of three phases become a direct current as shown in FIG. 7. Therefore the current command value is coincident with the actual electric current without deterioration in current control characteristic, and the steering assist characteristic is not deteriorated.

Under the condition of rotating the steering wheel, as the brushless motor 5 rotates, it is required that the three-phase current depicts sine waves as described above. Under the condition of relatively gentle steering such as in the case of driving the vehicle at a high speed, the current control system can follow up the steering condition and the steering assist characteristic is not deteriorated.

However, in the case that the brushless motor 5 rotates at a high speed, there is a possibility that, in the control by means of the three-phase alternating currents, a phase shift is generated between the current command value and the actual electric current depending on the current control characteristic.

More specifically, in the electric power steering control system, the rotation speed of the brushless motor 5 follows up the rotation speed of the steering wheel, and therefore when the steering wheel is turned sharply, the motor is abruptly rotated to a speed over the rotation speed performance thereof. As the motor is connected to the steering wheel through the reduction gear (for example, at gear ratio 28), frequency of the sine-wave current flowing into the motor becomes as follows. That is, gear ratio times (28 times) the steering rotation frequency×pole pair number times (4 times in case of the eight-pole motor)=112 times. Accordingly, frequency of the three-phase alternating current applied to the brushless motor 5 rises abruptly, and therefore in a system in which the electric current is controlled by the three-phase alternating current as shown in FIG. 4, the current control cannot follow up such a sharp rise and a phase shift takes place between the current command value and the actual electric current.

In the PM brushless motor, the phase shift means increase in reactive current, and supposing a phase shift with respect to an ideal current phase as α, the output torque is in proportion to COS α. In other words, when any phase shift is generated, the output torque of the steering assist motor is lowered, and as a result, manipulation of the steering wheel becomes heavy.

In the electric power steering control system, it is essential that the steering torque does not increase even when the steering wheel is turned sharply in terms of emergency behavior to avoid accident, and it is important to arrange the electric power steering control system so as not to increase the steering torque even when the steering wheel is turned sharply.

SUMMARY OF THE INVENTION

The present invention was made to solve the above-discussed problems and has an object of providing an electric power steering control system in which a brushless motor is used as a motor for generating a steering assist force, and error in torque control and transient vibration are small even when the steering wheel is turned sharply. The invention also provides a method for controlling electric power steering.

An electric power steering control system according to the invention arranged to control a drive current of a brushless motor that generates a steering assist force on the basis of a steering torque acting on a steering shaft and a vehicle speed, comprises:

a d-q-axis current command section for computing a d- and q-axis current command value for generating a steering assist force in response to a predetermined characteristic on the basis of the mentioned steering torque and the mentioned vehicle speed;

an electrical angle computing section for computing an electrical angle signal on the basis of a rotational position signal of the mentioned brushless motor;

a d-q coordinate transformation section for performing a d-q coordinate transformation on the basis of a detection current signal in response to a three-phase AC current to be inputted to the mentioned brushless motor and of the mentioned electrical angle signal, thereby obtaining a d- and q-axis detection current value;

a d-q axis voltage command section for computing a d- and q-axis voltage command value in response to a deviation between the mentioned d- and q-axis current command value and the mentioned d- and q-axis detection current value;

a d-q coordinate inverse transformation section for performing a d-q coordinate inverse transformation on the basis of the mentioned d- and q-axis voltage command value and the mentioned electrical angle signal thereby computing a three-phase voltage command value; and a PWM output section for generating a PWM waveform for PWM drive of the mentioned brushless motor in response to the mentioned three-phase voltage command value.

Thus, the system is arranged so that the brushless motor is used as the motor for generating a steering assist force, and the current control is performed on the d-q coordinate axis where the electric current can be treated in dc amount even when the motor is driven, and as a result, it is possible to achieve a reliable electric power steering control system in which error in torque control and transient vibration are both small even when the steering wheel is turned sharply.

It is preferable that the mentioned d-q axis current command section includes a q-axis current command part for computing the q-axis current command value for generating the steering assist force in response to a predetermined characteristic on the basis of the mentioned steering torque and the mentioned vehicle speed and a d-axis current setting part for setting zero as the d-axis current command value.

It is preferable that a computing expression for performing the d-q coordinate transformation on the basis of the mentioned detected current signal and the mentioned electrical angle signal is stored in the mentioned d-q coordinate transformation section.

It is preferable that a following mathematical expression is used as the mentioned computing expression:

$$\begin{bmatrix} Id \\ Iq \end{bmatrix} = \sqrt{2} \begin{bmatrix} -\sin\left(\theta + \frac{4}{3}\pi\right) & \sin\theta \\ -\sin\left(\theta + \frac{11}{6}\pi\right) & \sin\left(\theta + \frac{1}{2}\pi\right) \end{bmatrix} \begin{bmatrix} Iu \\ Iv \end{bmatrix}$$

where: Vu*, Vv* and Vw* are U-phase, V-phase and W-phase voltage command values; Vd* and Vq* are d- and q-axis voltage command values; and θ is an electrical angel in response to the rotational position of the brushless motor.

It is preferable that the mentioned d-q axis voltage command section adds a signal, to which proportionals control and integral control have been applied, to the mentioned current deviation values.

It is preferable that a computing expression for performing the d-q coordinate inverse transformation on the basis of the mentioned detected current signal and the mentioned electrical angle signal is stored in the mentioned d-q coordinate inverse transformation section.

It is preferable that a following mathematical expression is used as the mentioned computing expression:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$Vw^* = -Vu^* - Vv^*$$

where: Vu*, Vv* and Vw* are U-phase, V-phase and W-phase voltage command values; Vd* and Vq* are d- and q-axis voltage command values; and θ is an electrical angel in response to the rotational position of the brushless motor.

An electric power steering control method according to the invention arranged to control a drive current of a brushless motor that generates a steering assist force on the basis of a steering torque acting on a steering shaft and a vehicle speed, comprises:

a first step of computing a d- and q-axis current command value for generating a steering assist force in accordance with a predetermined characteristic on the basis of the mentioned steering torque and the mentioned vehicle speed;

a second step of performing a d-q coordinate transformation on the basis of a detection current signal in response to a three-phase AC current to be inputted to the mentioned brushless motor and an electrical angle signal in response to a rotational position of the mentioned brushless motor, thereby obtaining a d- and q-axis detection current value;

a third step of computing a d- and q- axis voltage command value in response to a deviation between the mentioned d- and q-axis current command value and the mentioned d- and q- axis detection current value;

a fourth step of performing a d-q coordinate inverse transformation on the basis of the mentioned d- and q-axis voltage command value and the mentioned electrical angle signal, thereby computing a three-phase voltage command value; and a fifth step of generating a PWM waveform for PWM drive of the mentioned brushless motor in response to the mentioned three-phase voltage command value.

Thus, the method is arranged so that the brushless motor is used as the motor for generating a steering assist force, and the current control is performed on the d-q coordinate axis where the electric current can be treated in dc amount even when the motor is driven, and as a result, it is possible to achieve a reliable electric power steering control system in which error in torque control and transient vibration are both small even when the steering wheel is turned sharply.

It is preferable that, in the mentioned first step, the q-axis current command value for generating the steering assist force in response to the predetermined characteristic on the basis of the mentioned steering torque and the mentioned vehicle speed is computed, and zero is set as the d-axis current command value.

It is preferable that, in the mentioned second step, the d-q coordinate transformation on the basis of the mentioned detected current signal and the mentioned electrical angle signal is performed in accordance with a computing expression preliminarily stored.

It is preferable that a following mathematical expression is used as the mentioned computing expression:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$Vw^* = -Vu^* - Vv^*$$

where: Vu*, Vv* and Vw* are U-phase, V-phase and W-phase voltage command values; Vd* and Vq* are d- and q-axis voltage command values; and θ is an electrical angel in response to the rotational position of the brushless motor.

It is preferable that, in the mentioned fourth step, the d-q coordinate inverse transformation on the basis of the mentioned d-axis and q-axis voltage command values and the mentioned electrical angle signal is performed in accordance with a computing expression preliminarily stored.

It is preferable that, in the mentioned fourth step, a following mathematical expression is used as the mentioned computing expression:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$Vw^* = -Vu^* - Vv^*$$

where: Vu*, Vv* and Vw* are U-phase, V-phase and W-phase voltage command values; Vd* and Vq* are d- and q-axis voltage command values; and θ is an electrical angel in response to the rotational position of the brushless motor.

It is preferable that, the motor control process according to the mentioned second to fifth steps is performed as an interruption of a cycle shorter than that of the d-q axis current command computing process according to the foregoing first step.

DESCRIPTION OF THE PREFERRED EMBODIMENTS

Embodiment 1

Figure 1:
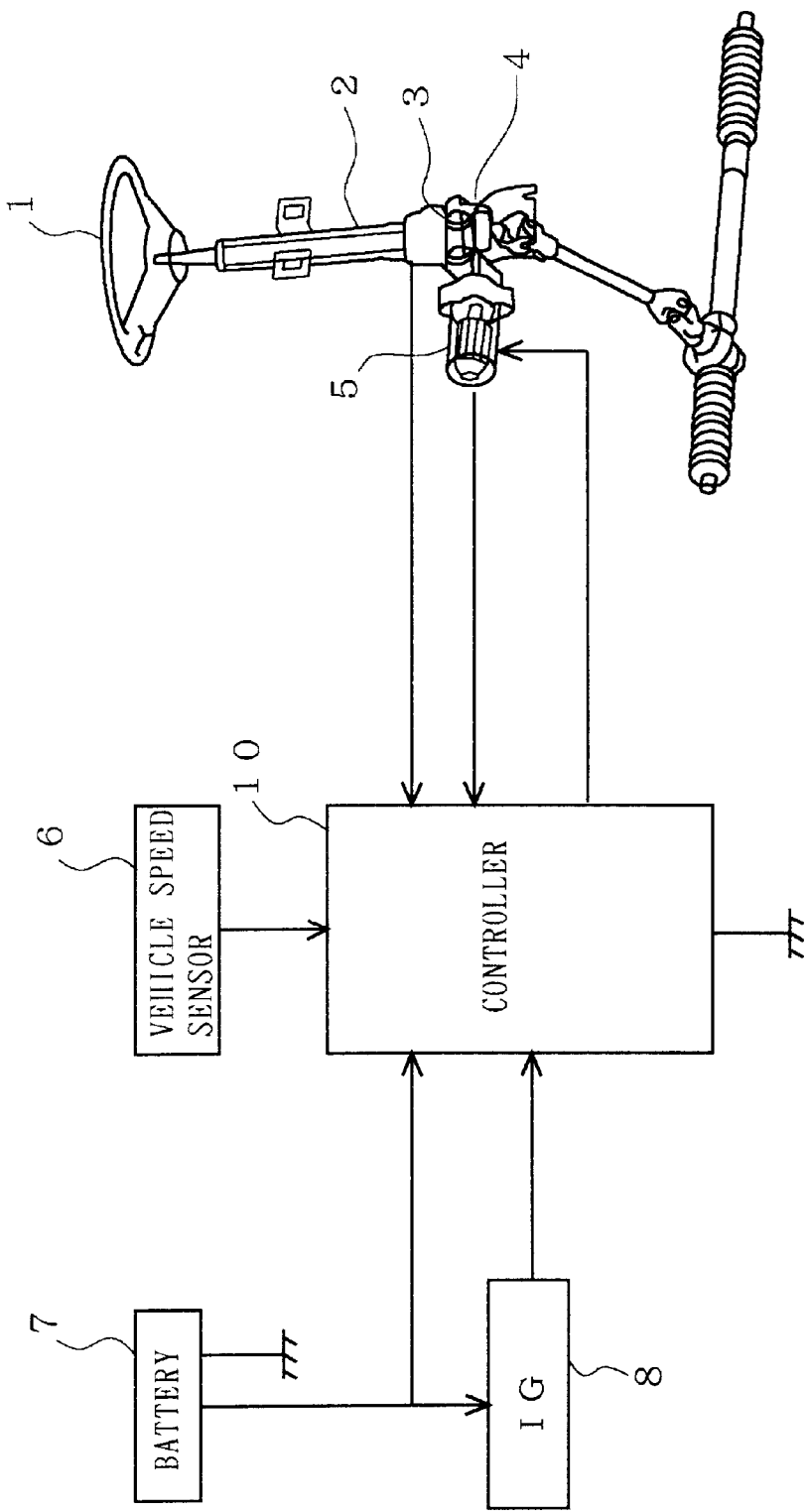
FIG. 1 is a schematic view showing an arrangement of Embodiment 1 according to the present invention.

An electric power steering control system according to Embodiment 1 of the present invention is hereinafter described referring to the drawings.

FIG. 1 is a schematic diagram of the electric power steering control system according to Embodiment 1. A PWM brushless motor 5, which generates a steering assist torque, is coupled to one end of a steering shaft 2 via a deceleration gear 4. A steering wheel 1 is connected to the other end of the steering shaft 2. Further, the steering shaft 2 is provided with a torque sensor 3 for detecting a steering torque of the steering wheel 1.

A controller 10 determines a steering assist torque on the basis of a steering torque value detected by the torque sensor 3 and a vehicle speed value detected by a vehicle speed sensor 6. Further, the controller 10 PWM drives the brushless motor 5 thereby assisting the steering of the steering wheel 1.

In addition, a battery 7, an ignition key switch 8 and others are connected to the controller 10.

Figure 2:
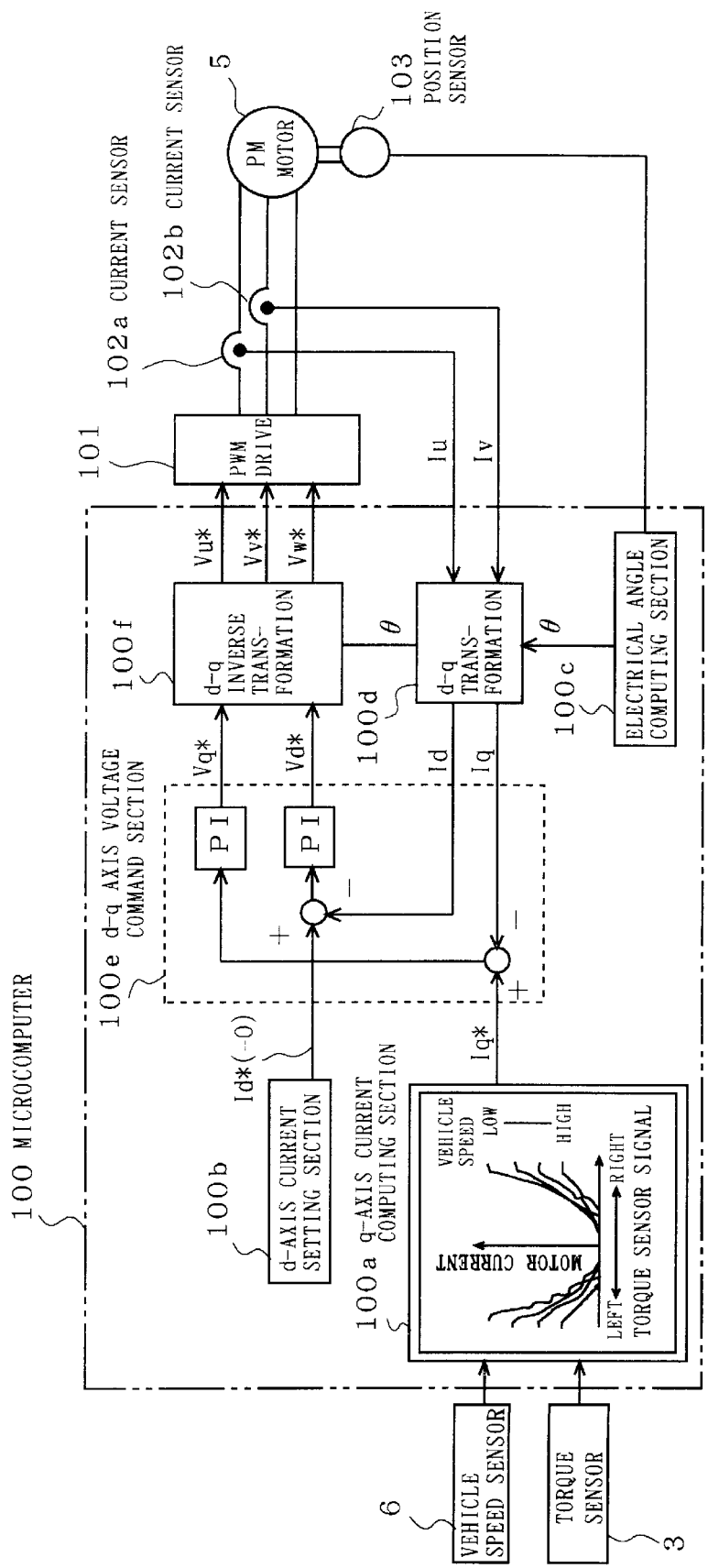
FIG. 2 is a block diagram showing an operation of Embodiment 1 according to the invention.

FIG. 2 a block diagram showing operation of the electric power steering control system according to Embodiment 1. A control computer 100 disposed in the controller 10 includes a q-axis current computing section 10a, a d-axis current setting section 10b, an electrical angle computing section 100c, a d-q coordinate transformation section 100d, a d-q axis voltage command section 100e, and a d-q coordinate inverse transformation section 100f.

The q-axis current computing section 100a carries out computation (operation) in accordance with a predetermined characteristic on the basis of a torque detection signal from the torque sensor 3 and a vehicle-speed detection signal from the vehicle speed sensor 6. Thus, a current command value Iq* is determined for driving the brushless motor 5. Then, the section 100a feeds the determined current command value to the d-q axis voltage command section 100e.

The d-axis current setting section 100b feeds a d-axis current command value Id*=0 (zero) to the d-q-axis voltage command section 100e.

The electrical angle computing section 100c computes an electrical angle on the basis of the rotational position signal detected by a sensor 103 mounted onto the brushless motor 5. Further, the section 100c feeds the computed electrical angle signal θ to the d-q coordinate transformation section 100d and the d-q coordinate inverse transformation section 100f.

The d-q coordinate transformation section 100d stores therein a computing expression for performing the d-q coordinate transformation on the basis of detection current signals Iu, Iv detected by current sensors 102a, 102b, and the electrical angle signal θ. Further, the section 100d carries out the d-q coordinate transformation on the basis of the detection current signals Iu, Iv and the electrical angle signal θ and feeds d- and q-axis detection current values to d-q axis voltage command section 100e after the transformation.

Figure 8:
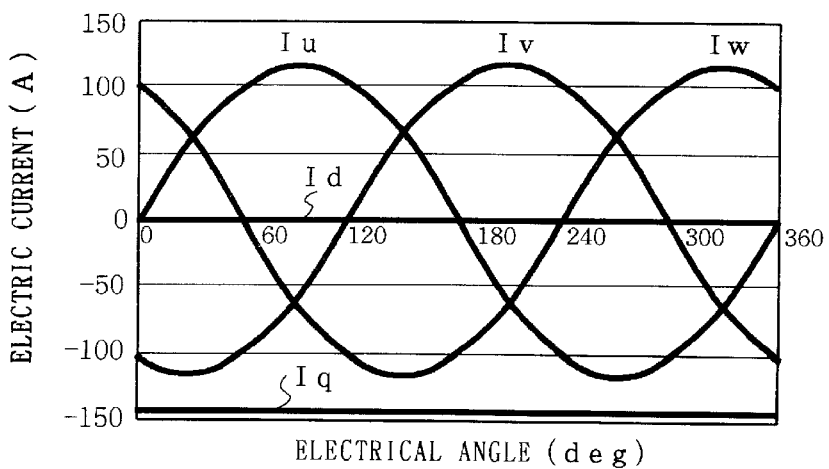
FIG. 8 is a current waveform diagram to explain an operation of the d-q coordinate transformation.

Transforming the coordinates from a three-phase alternating-current coordinate system into a two-axis direct-current coordinate system performs the d-q coordinate transformation, and as shown in FIG. 8, three-phase alternating currents Iu, Iv are transformed into two-axis direct currents Id, Iq through the d-q coordinate transformation.

The d-q axis voltage command section 100e computes deviation in current between the d- and q-axis current command values Id*, Iq* and the d- and q-axis detection current values Id, Iq after the transformation. Further, by adding the signals, to which a proportional control and an integral control are respectively applied, to the computed deviation value, the section 100e determines a d-q axis voltage command values vd*,Vq* and feeds them to the d-q coordinate inverse transformation section 100f.

The d-q coordinate inverse transformation section 100f stores therein a computing expression to perform the d-q coordinate inverse transformation on the basis of the d-q axis voltage command values Vd*, Vq* and the electrical angle signal θ. Further, the section 100f carries out the d-q coordinate inverse transformation on the basis of the d-q axis voltage command values vd*, Vq* and the electrical angle signal θ, thereby generating the three-phase voltage command values Vu*, VV*, Vw*.

The PWM drive 101 performs a drive control of the brushless motor 5 according to the three-phase voltage command values Vu*, Vv*, Vw* from the control computer 100, and generates a steering assist force.

Figure 3:
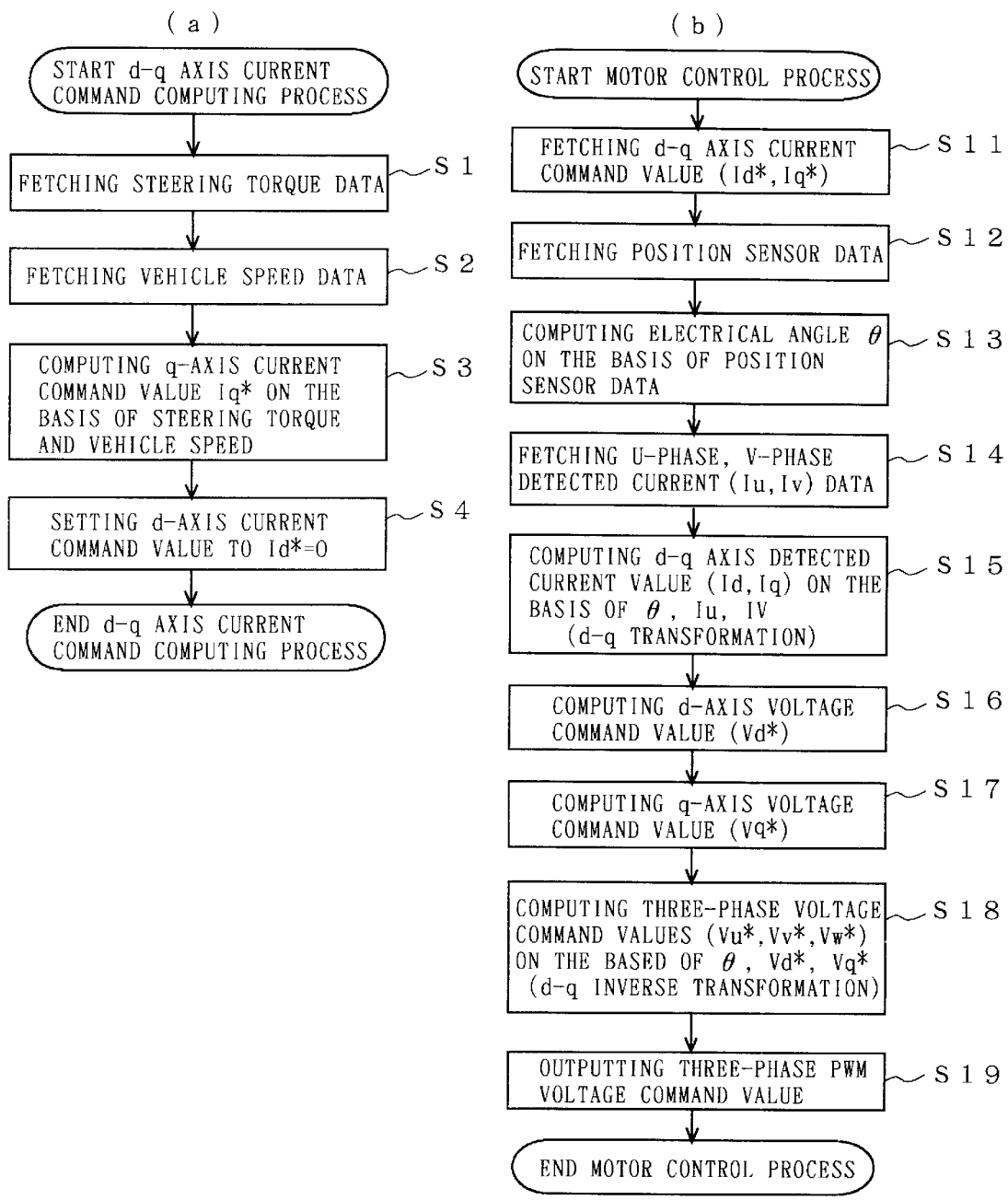
FIG. 3 is a flowchart for explaining an operation of an essential part according to Embodiment 1 of the invention.
Figure 4:
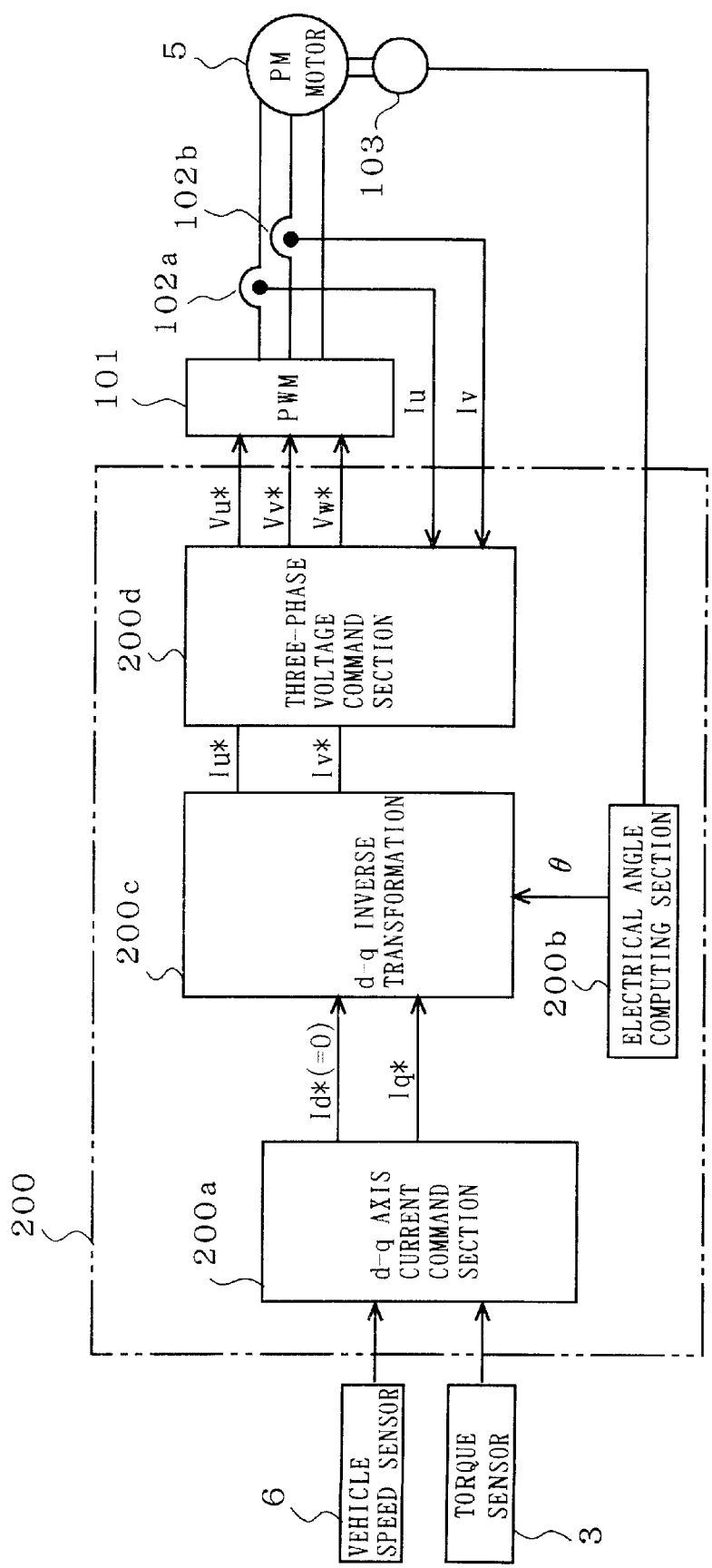
FIG. 4 is a schematic block diagram showing one example of performing a current control by three-phase alternating current.
Figure 5:
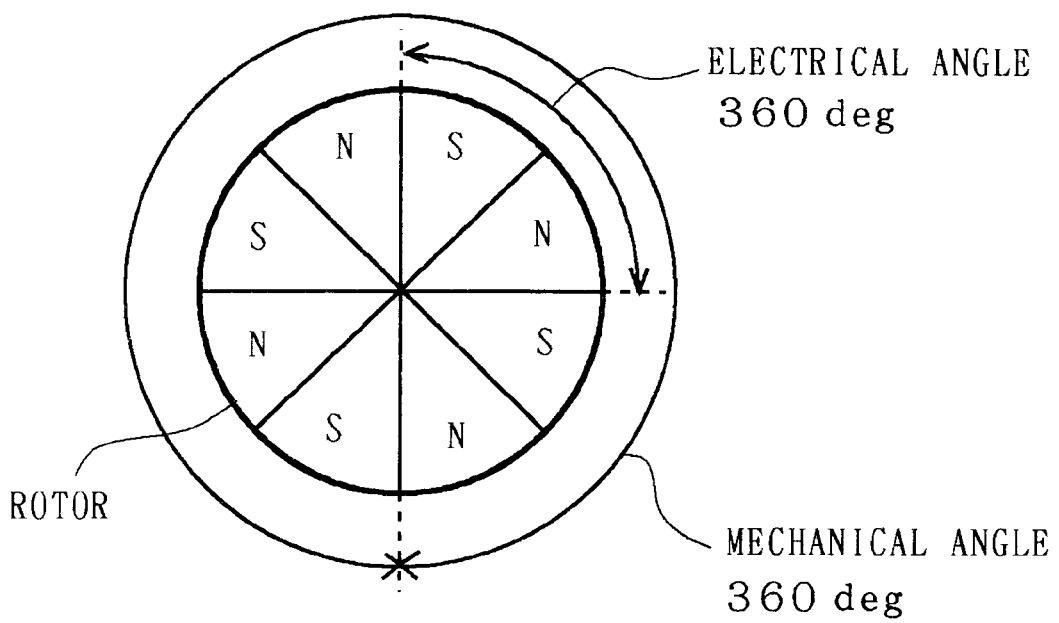
FIG. 5 is an explanatory view showing one example of the relation between mechanical angle and electrical angle of the brushless motor.
Figure 6:
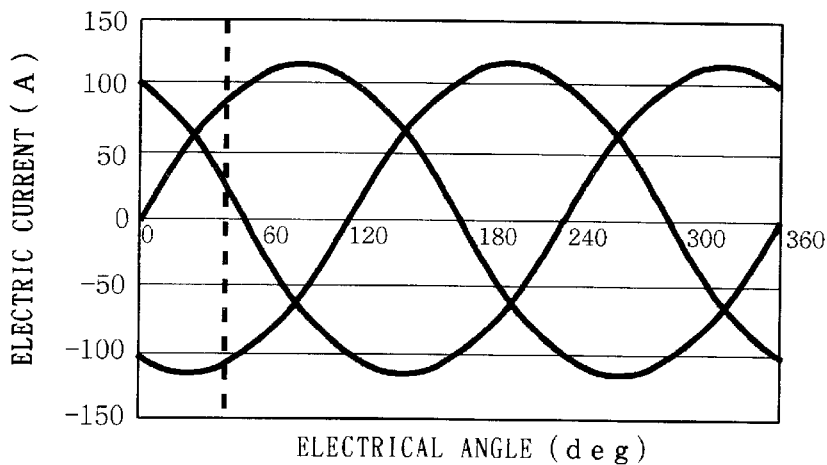
FIG. 6 is a current waveform diagram to explain an operation of the current control by three-phase alternating current.
Figure 7:
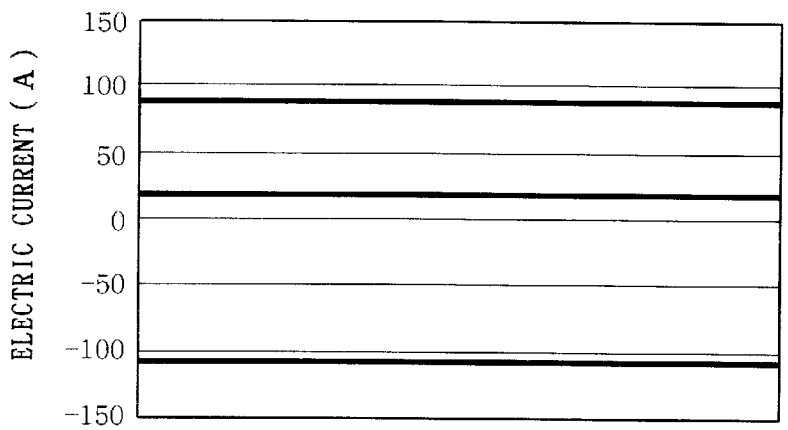
FIG. 7 is a current waveform diagram to explain an operation f the current control by three-phase alternating current.

FIG. 3 is a flow chart to explain an operation of the control computer 100, and in which (a) shows a flow of computing process of the d-q axis current command, and (b) shows a flow of motor control process.

Both of the d-q axis current command computing process and the motor control process are performed as an interruption operation with a regular cycle, however, the motor control process is performed with a cycle that is about 1/10 times as small as the interruption cycle of the d-q axis current command computing process.

In the flow of the d-q axis current command computing process of FIG. 3(a), when a start command of the d-q axis current command computing process is issued, first in step S1, steering torque data detected by the torque sensor 3 are fetched in. Then in step S2, vehicle-speed data detected by the vehicle speed sensor 6 are fetched in.

Next in step S3, on the basis of the steering torque and the vehicle speed having been fetched in, a q-axis current command value Iq* is computed. Finally in step S4, the d-axis current command value Id* is set to zero, thus ending the d-q axis current command computing process.

In the flow of the motor control process of FIG. 3(b), when a start command of the motor control processing is issued, first in step S11, the d-and q-axis current command values Id*, Iq* having been obtained at the d-q axis current command computing process are fetched in.

Next, in step S12, position sensor data are fetched in from the position sensor 103. In step S13, an electrical angle θ is computed on the basis of the position sensor data. In step S14, data of U-phase and V-phase detection currents Iu, Iv from the current sensors 102a, 102b are fetched in. In step S15, the d-q coordinate transformation is performed on the basis of the electrical angle θ and the U-phase and V-phase detection currents Iu, Iv, thereby obtaining the d- and q-axis detection current values Id, Iq. Further, in steps S16 and S17, the d- and q-axis voltage command values Vd*, Vq* are computed respectively. Subsequently, in step S18, on the basis of the electrical angle θ and the d- and q-axis voltage command values Vd*, Vq*, the d-q coordinate inverse transformation is performed thereby obtaining the three-phase voltage command values Vu*, Vv*, Vw*.

Finally in step S19, these values are outputted to the PMW drive section 10 as the three-phase PWM voltage commands, thus ending the motor control process.

This motor control process can be performed in such a manner that, if the interruption cycle of the d-q axis current command processing is, for example, 1 ms, the interruption cycle for the motor control process can be approximately 1/10 times as small as that of the d-q axis current command process, that is, about 100 μs. Therefore, the torque control of the motor is performed precisely so that variation in torque or generation of torque ripple may be reduced.

In addition, in the case of the three-phase current detection Iu, Iv, Iw, the d-q coordinate transformation is computed on the following mathematical expression 9:

$$\begin{bmatrix} Id \\ Iq \end{bmatrix} = \sqrt{\frac{2}{3}} \begin{bmatrix} \cos\theta & \cos\left(\theta - \frac{2}{3}\pi\right) & \cos\left(\theta + \frac{2}{3}\pi\right) \\ -\sin\theta & -\sin\left(\theta - \frac{2}{3}\pi\right) & -\sin\left(\theta + \frac{2}{3}\pi\right) \end{bmatrix} \begin{bmatrix} Iu \\ Iv \\ Iw \end{bmatrix}$$

Further, in the case of the two-phase current detection Iu, Iv, the d-q coordinate transformation is computed on the following mathematical expression 10 or 11:

$$Iw = -Iu - Iv$$

$$\begin{bmatrix} Id \\ Iq \end{bmatrix} = \sqrt{2} \begin{bmatrix} \sin\left(\theta + \frac{\pi}{3}\right) & \sin\theta \\ \cos\left(\theta + \frac{\pi}{3}\right) & \cos\theta \end{bmatrix} \begin{bmatrix} Iu \\ Iv \end{bmatrix}$$

or $$\sin\left(\frac{\pi}{2} \pm \theta\right) = \cos\theta$$

$$\begin{bmatrix} Id \\ Iq \end{bmatrix} = \sqrt{2} \begin{bmatrix} -\sin\left(\theta + \frac{4}{3}\pi\right) & \sin\theta \\ -\sin\left(\theta + \frac{11}{6}\pi\right) & \sin\left(\theta + \frac{1}{2}\pi\right) \end{bmatrix} \begin{bmatrix} Iu \\ Iv \end{bmatrix}$$

Among the above expressions 9, 10, 11, the expressions 9, 10 require both sine table and cosine table. However, the expression 11 requires only the sin table, thus load for computation is advantageously small.

In addition, the d-q coordinate inverse transformation is computed on the following mathematical expression 12 or 13.

$$\begin{bmatrix} Vu^* \\ Vv^* \\ Vw^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} Vd^* \\ Vq^* \end{bmatrix} =$$

$$\sqrt{\frac{2}{3}} \begin{bmatrix} \cos\theta & -\sin\theta \\ \cos\left(\theta - \frac{2}{3}\pi\right) & -\sin\left(\theta - \frac{2}{3}\pi\right) \\ \cos\left(\theta + \frac{2}{3}\pi\right) & -\sin\left(\theta + \frac{2}{3}\pi\right) \end{bmatrix} \begin{bmatrix} Vd^* \\ Vq^* \end{bmatrix}$$

or $$\sin\left(\frac{\pi}{2} \pm \theta\right) = \cos\theta$$

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$Vw^* = -Vu^* - Vv^*$$

Likewise in this case, the expression 12 requires both sine table and cosine table, while the expression 13 requires only the sine table, which is an advantage of small load for computation.

As is described so far, in the foregoing electric power steering control system according to this Embodiment 1, the brushless motor is used as the motor for generating the steering assist force, which greatly decreases troubles as compared with the conventional system using the direct current motor with the brush. Furthermore, the system is arranged so that the electric current is controlled on the d-q coordinate axis where the electric current can be treated in dc amount even when the motor is driven. As a result, it is possible to prevent increase in torque control error and transient vibration particularly when the steering wheel is turned sharply, as compared with the conventional system in which electric current is controlled by three-phase alternating current.

What is claimed is:

1. An electric power steering control system arranged to control a drive current of a brushless motor that generates a steering assist force on the basis of a steering torque acting on a steering shaft and a vehicle speed, comprising:

a d-q-axis current command section for computing a d- and q-axis current command value for generating a steering assist force in response to a predetermined characteristic on the basis of said steering torque and said vehicle speed;

an electrical angle computing section for computing an electrical angle signal on the basis of a rotational position signal of said brushless motor;

a d-q coordinate transformation section for performing a d-q coordinate transformation on the basis of a detection current signal in response to a three-phase AC current to be inputted to said brushless motor and of said electrical angle signal, thereby obtaining a d- and q-axis detection current value;

a d-q axis voltage command section for computing a d- and q-axis voltage command value in response to a deviation between said d-and q-axis current command value and said d- and q-axis detection current value;

a d-q coordinate inverse transformation section for performing a d-q coordinate inverse transformation on the basis of said d- and q-axis voltage command value and said electrical angle signal thereby computing a three-phase voltage command value; and a PWM output section for generating a PWM waveform for PWM drive of said brushless motor in response to said three-phase voltage command value.

2. The electric power steering control system according to claim 1, wherein said d-q axis current command section includes a q-axis current command part for computing the q-axis current command value for generating the steering assist force in response to a predetermined characteristic on the basis of said steering torque and said vehicle speed and a d-axis current setting part for setting zero as the d-axis current command value.

3. The electric power steering control system according to claim 1, wherein a computing expression for performing the d-q coordinate transformation on the basis of said detected current signal and said electrical angle signal is stored in said d-q coordinate transformation section.

4. The electric power steering control-system according to claim 3, wherein a following mathematical expression is used as said computing expression:

$$\begin{bmatrix} Id \\ Iq \end{bmatrix} = \sqrt{2} \begin{bmatrix} -\sin\left(\theta + \frac{4}{3}\pi\right) & \sin\theta \\ -\sin\left(\theta + \frac{11}{6}\pi\right) & \sin\left(\theta + \frac{1}{2}\pi\right) \end{bmatrix} \begin{bmatrix} Iu \\ Iv \end{bmatrix}$$

where: Vu*, Vv* and Vw* are U-phase, V-phase and W-phase voltage command values; Vd* and Vq* are d- and q-axis voltage command values; and θ is an electrical angel in response to the rotational position of the brushless motor.

5. The electric power steering control system according to claim 1, wherein said d-q axis voltage command section adds a signal, to which proportional control and integral control have been applied, to said current deviation values.

6. The electric power steering control system according to claim 1, wherein a computing expression for performing the d-q coordinate inverse transformation on the basis of said detected current signal and said electrical angle signal is stored in said d-q coordinate inverse transformation section.

7. The electric power steering control system according to claim 1, wherein a following mathematical expression is used as said computing expression:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$Vw^* = -Vu^* - Vv^*$$

where: Vu*, Vv* and Vw* are U-phase, V-phase and W-phase voltage command values; Vd* and Vq* are d- and q-axis voltage command values; and θ is an electrical angel in response to the rotational position of the brushless motor.

8. An electric power steering control method arranged to control a drive current of a brushless motor that generates a steering assist force on the basis of a steering torque acting on a steering shaft and a vehicle speed, comprising:

a first step of computing a d- and q-axis current command value for generating a steering assist force in response to a predetermined characteristic on the basis of said steering torque and said vehicle speed;

a second step of performing a d-q coordinate transformation on the basis of a detection current signal in response to a three-phase AC current to be inputted to said brushless motor and an electrical angle signal in response to a rotational position of said brushless motor, thereby obtaining a d- and q-axis detection current value;

a third step of computing a d- and q- axis voltage command value in response to a deviation between said d- and q-axis current command value and said d- and q-axis detection current value;

a fourth step of performing a d-q coordinate inverse transformation on the basis of said d- and q-axis voltage command value and said electrical angle signal, thereby computing a three-phase voltage command value; and a fifth step of generating a PWM waveform for PWM drive of said brushless motor in response to said three-phase voltage command value.

9. The electric power steering control method according to claim 8, wherein, in said first step, the q-axis current command value for generating the steering assist force in response to the predetermined characteristic on the basis of said steering torque and said vehicle speed is computed, and zero is set as the d-axis current command value.

10. The electric power steering control method according to claim 8, wherein, in said second step, the d-q coordinate transformation on the basis of said detected current signal and said electrical angle signal is performed in accordance with a computing expression preliminarily stored.

11. The electric power steering control method according to claim 10, wherein a following mathematical expression is used as said computing expression:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$Vw^* = -Vu^* - Vv^*$$

where: Vu*, Vv* and Vw* are U-phase, V-phase and W-phase voltage command values; Vd* and Vq* are d- and q-axis voltage command values; and θ is an electrical angel in response to the rotational position of the brushless motor.

12. The electric power steering control method according to claim 8, wherein, in said fourth step, the d-q coordinate inverse transformation on the basis of said d-axis and q-axis voltage command values and said electrical angle signal is performed in accordance with a computing expression preliminarily stored.

13. The electric power steering control method according to claim 12, wherein in said fourth step, a following mathematical expression is used as said computing expression:

$$\begin{bmatrix} Vu^* \\ Vv^* \end{bmatrix} = \sqrt{\frac{2}{3}} \begin{bmatrix} \sin\left(\theta + \frac{1}{2}\pi\right) & -\sin\theta \\ \sin\left(\theta + \frac{11}{6}\pi\right) & -\sin\left(\theta + \frac{4}{3}\pi\right) \end{bmatrix} \begin{bmatrix} Vd^* \\ Vq^* \end{bmatrix}$$

$$Vw^* = -Vu^* - Vv^*$$

where: Vu*, Vv* and Vw* are U-phase, V-phase and W-phase voltage command values; Vd* and Vq* are d- and q-axis voltage command values; and θ is an electrical angel in response to the rotational position of the brushless motor.

14. The electric power steering control method according to claim 8, wherein the motor control process according to the mentioned second to fifth steps is performed in a cycle shorter than that of the d-q axis current command computing process according to the foregoing first step.

* * * * *